US007720041B2

(12) United States Patent
Frederiksen et al.

(10) Patent No.: US 7,720,041 B2
(45) Date of Patent: *May 18, 2010

(54) METHOD AND SYSTEM FOR TRANSPORT BLOCK SIZE SIGNALING BASED ON A MODULATION TYPE FOR HSDPA

(76) Inventors: Frank Frederiksen, Hornbaekvej 4, DK-9270 Klarup (DK); Esa Malkamaki, Riippakoivuntie 17B, 02130 Espoo (FI)

(*) Notice: Subject to any disclaimer, the term of this patent is extended or adjusted under 35 U.S.C. 154(b) by 94 days.

This patent is subject to a terminal disclaimer.

(21) Appl. No.: 11/944,228

(22) Filed: Nov. 21, 2007

(65) Prior Publication Data
US 2008/0123684 A1 May 29, 2008

Related U.S. Application Data

(63) Continuation of application No. 10/214,613, filed on Aug. 9, 2002, now Pat. No. 7,301,929.

(51) Int. Cl.
*H04B 7/216* (2006.01)
(52) U.S. Cl. .................. 370/342; 370/335; 370/441
(58) Field of Classification Search .......... 370/328, 370/329, 335, 342, 347, 349, 441, 442, 465, 370/469, 473, 336, 467
See application file for complete search history.

(56) References Cited

U.S. PATENT DOCUMENTS

| 6,697,988 | B2 | | 2/2004 | Kim et al. | |
|---|---|---|---|---|---|
| 7,050,413 | B2 | * | 5/2006 | Takano | 370/335 |
| 7,054,288 | B2 | * | 5/2006 | Sternberg et al. | 370/329 |
| 7,200,405 | B2 | * | 4/2007 | Rudolf et al. | 455/450 |
| 7,283,508 | B2 | * | 10/2007 | Choi et al. | 370/341 |
| 7,388,848 | B2 | * | 6/2008 | Virtanen et al. | 370/329 |
| 7,400,607 | B2 | * | 7/2008 | Kim et al. | 370/335 |
| 7,406,070 | B2 | * | 7/2008 | Nilsson | 370/342 |
| 7,414,989 | B2 | * | 8/2008 | Kuchibhotla et al. | 370/329 |
| 7,426,201 | B2 | * | 9/2008 | Kim et al. | 370/335 |
| 7,508,804 | B2 | * | 3/2009 | Das et al. | 370/342 |
| 2002/0141367 | A1 | | 10/2002 | Hwang et al. | |

(Continued)

OTHER PUBLICATIONS

Ericsson, Transport Block Sizes for HS-DSCH, TSG-RAN WG2 #30, Tdoc R2-0221668, Jun. 24-27, 2002, pp. 1-7.

(Continued)

*Primary Examiner*—Chi H. Pham
*Assistant Examiner*—Kevin Mew

(57) ABSTRACT

A device for communicating with a mobile device is provided. The devices includes a transmitter. The transmitter transmit a first modulation scheme, a first transport block size, and a first redundancy version to a mobile device. The first transport block size is represented by a first number of bits and the first redundancy version is represented by a second number of bits. The transmitter transmits a packet based on the first modulation scheme to a mobile device. transmitter transmits a second modulation scheme, a second transport block size, and a second redundancy version to the mobile device. The second transport block size is represented by a third number of bits and the second redundancy version is represented by a fourth number of bits, wherein the third number of bits is greater than the first number of bits, and the fourth number of bits is less than the second number of bits. The transmitter transmits the packet based on the second modulation scheme to the mobile device.

20 Claims, 5 Drawing Sheets

U.S. PATENT DOCUMENTS

| | | |
|---|---|---|
| 2003/0002472 A1 | 1/2003 | Choi et al. |
| 2003/0007480 A1 | 1/2003 | Kim et al. |
| 2003/0081692 A1 | 5/2003 | Kwan et al. |
| 2003/0142694 A1* | 7/2003 | Takano ................. 370/477 |
| 2003/0152062 A1 | 8/2003 | Terry et al. |
| 2003/0153276 A1 | 8/2003 | Terry et al. |
| 2003/0189918 A1 | 10/2003 | Das et al. |
| 2003/0210668 A1 | 11/2003 | Malladi et al. |
| 2005/0073987 A1 | 4/2005 | Wu |
| 2005/0157687 A1* | 7/2005 | Heo et al. ............... 370/335 |
| 2005/0213536 A1* | 9/2005 | Virtanen et al. ......... 370/329 |
| 2008/0123601 A1* | 5/2008 | Malladi et al. .......... 370/335 |
| 2009/0034461 A1* | 2/2009 | Pelletier et al. ......... 370/329 |
| 2009/0219870 A1* | 9/2009 | Wengerter et al. ...... 370/329 |

OTHER PUBLICATIONS

3GPP TS 25.212 V5.1.0 (Jun. 2002), Technical Specification, $3^{rd}$ Generation Partnership Project; Technical Specification Group Radio Access Network; Multiplexing and channel coding (FDD), Release 5, pp. 1-74.

3GPP TS 25.321 V5.1.0 (Jun. 2002), Technical Specification, $3^{rd}$ Generation Partnership Project; Technical Specification Group Radio Access Network; MAC protocol specification (Release 5), pp. 1-52.

* cited by examiner

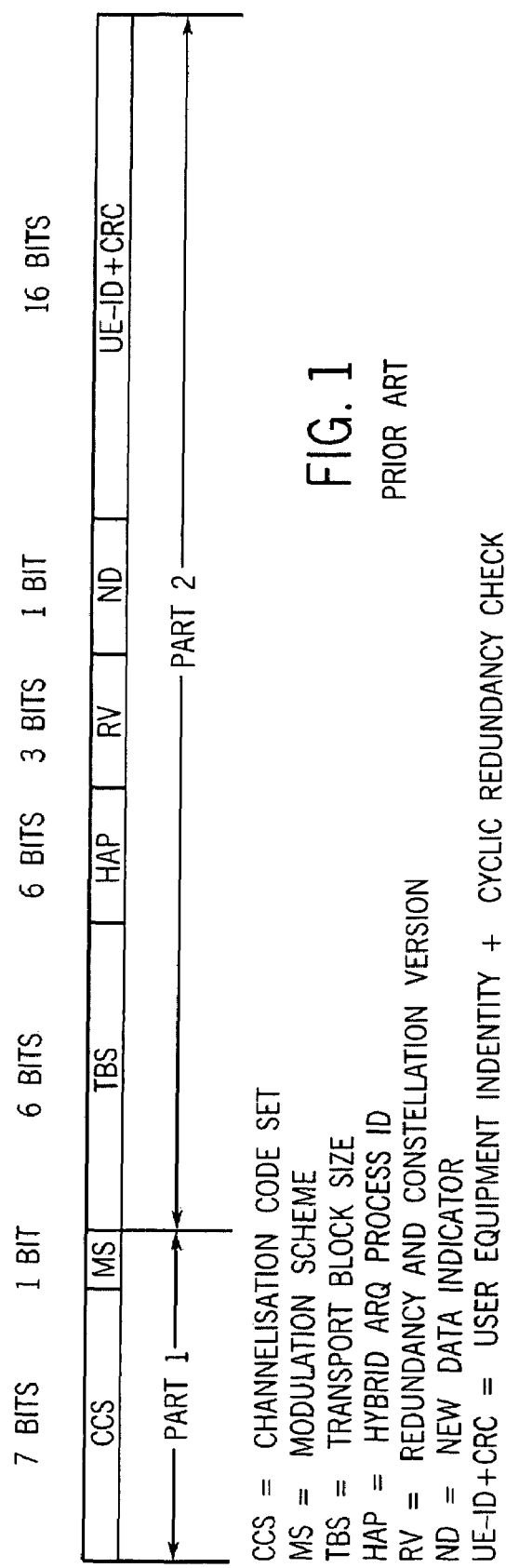

FIG. 3

| PART 1 | | PART 2 | | | | MODE |
|---|---|---|---|---|---|---|
| CODESET | MODULATION SCHEME | TRANSPORT BLOCK SIZE | H-ARQ PROCESS NUMBER | REDUNDANCY VERSION | NEW DATA INDICATOR | CRC | MODULATION MODE |
| 7 | 1 | 8 | 3 | 2 | 1 | 16 | QPSK |
| 7 | 1 | 7 | 3 | 3 | 1 | 16 | 16-QAM |

FIG. 4

| PART 1 | | PART 2 | | | | MODE |
|---|---|---|---|---|---|---|
| CODESET | MODULATION SCHEME | TRANSPORT BLOCK SIZE | H-ARQ PROCESS NUMBER | REDUNDANCY VERSION | NEW DATA INDICATOR | CRC | MODULATION MODE |
| 7 | 1 | 8 | 3 | 1 | 1 | 16 | QPSK |
| 7 | 1 | 6 | 3 | 3 | 1 | 16 | 16-QAM |

FIG. 5

| PART 1 | | PART 2 | | | | MODE |
|---|---|---|---|---|---|---|
| CODESET | MODULATION SCHEME | TRANSPORT BLOCK SIZE | H-ARQ PROCESS NUMBER | REDUNDANCY VERSION | NEW DATA INDICATOR | CRC | MODULATION MODE |
| 7 | 1 | 8 | 3 | 1 | 1 | 16 | QPSK |
| 7 | 1 | 7 | 3 | 2 | 1 | 16 | 16-QAM |

METHOD AND SYSTEM FOR TRANSPORT BLOCK SIZE SIGNALING BASED ON A MODULATION TYPE FOR HSDPA

CROSS-REFERENCE TO RELATED APPLICATIONS

This application is a continuation filed under 35 U.S.C. §120 of U.S. patent application Ser. No. 10/214,613 that was filed Aug. 9, 2002, the disclosure of which is incorporated by reference in its entirety.

FIELD

The field of the disclosure relates generally to transport block size signaling, and more specifically to transport block size signaling based on modulation type.

BACKGROUND

In systems that include mobile devices, packets are generally sent using one of many modulations schemes. All packets sent during a given transfer generally conform to the same transport block size (TBS). The sender of the packets sends the receiver information telling the receiver the modulation scheme and transport block size, among other things, before the packets are sent. Therefore, once the packets are sent, the receiver knows the modulation scheme, the number of multicodes, and the transport block size of the packets and, therefore, can correctly decipher and receive the information.

Currently, much discussion has been centered around increasing the number of bits allocated for the definition of the transport block size (currently 6 bits) to allow for a higher resolution. These discussions have been particularly common with those involved in 3GPP (Third Generation Partnership Project) standardization work. Specifically, those individuals working in areas related to Wideband Code Division Multiple Access (WCDMA) and High Speed Downlink Packet Access (HSDPA). In HSDPA, the TBS is placed, along with other information, in the high-speed shared control channel (HS-SCCH). FIG. 1 shows a diagram of a current allocation of HS-SCCH signaling bits.

One suggestion is a mapping of the transport block sizes through a logarithmic conversion to minimize the worst-case relative padding in case the MAC-PDU is not of exactly the same size as the available transport block sizes. This is discussed in document R2-0221668, entitled "Signaling of Transport Block Sizes for HS-DSCH" (Ericsson). However, this approach assumes a fixed number of bits for the signaling of the transport block size, and the transport block sizes are dependent on the modulation and multicode setting. Therefore, in cases where a packet is transferred and an error has occurred and retransmission is requested, the retransmission according to this approach, must occur using the same modulation scheme. Thus, a transmitting device (e.g., base station) cannot freely select a modulation scheme whenever a retransmission is required.

SUMMARY

In an exemplary embodiment, a device is provided for communicating with a mobile device. The device transmits a first modulation scheme, a first transport block size, and a first redundancy version to the mobile device and then transmits a packet based on the first modulation scheme to the mobile device. The device also transmits a second modulation scheme, a second transport block size, and a second redundancy version to the mobile device and then transmits the packet based on the second modulation scheme to the mobile device. The first transport block size is represented by a first number of bits, the first redundancy version is represented by a second number of bits, the second transport block size is represented by a third number of bits, and the second redundancy version is represented by a fourth number of bits. The third number of bits is greater than the first number of bits, and the fourth number of bits is less than the second number of bits.

In an exemplary embodiment, a device is provided for communicating with another device. The device receives a first modulation scheme, a first transport block size, and a first redundancy version from a first device and then receives a packet based on the first modulation scheme from the first device. The device also receives a second modulation scheme, a second transport block size, and a second redundancy version from the first device and then receives the packet based on the second modulation scheme from the first device. The first transport block size is represented by a first number of bits, the first redundancy version is represented by a second number of bits, the second transport block size is represented by a third number of bits, and the second redundancy version is represented by a fourth number of bits. The third number of bits is greater than the first number of bits, and the fourth number of bits is less than the second number of bits.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference, to the accompanying drawings, wherein like numerals denote like elements.

FIG. 1 is a diagram of current allocation of HS-SCCH signaling bits;

FIG. 2 is a diagram of allocation of HS-SCCH signaling bits according to an example embodiment of the present invention;

FIG. 3 is a diagram of allocation of HS-SCCH signaling bits according to a second example embodiment of the present invention;

FIG. 4 is a diagram of allocation of HS-SCCH signaling bits according to a third example embodiment of the present invention;

FIG. 5 is a diagram of allocation of HS-SCCH signaling bits according to a fourth example embodiment of the present invention;

DETAILED DESCRIPTION

Figure 6:
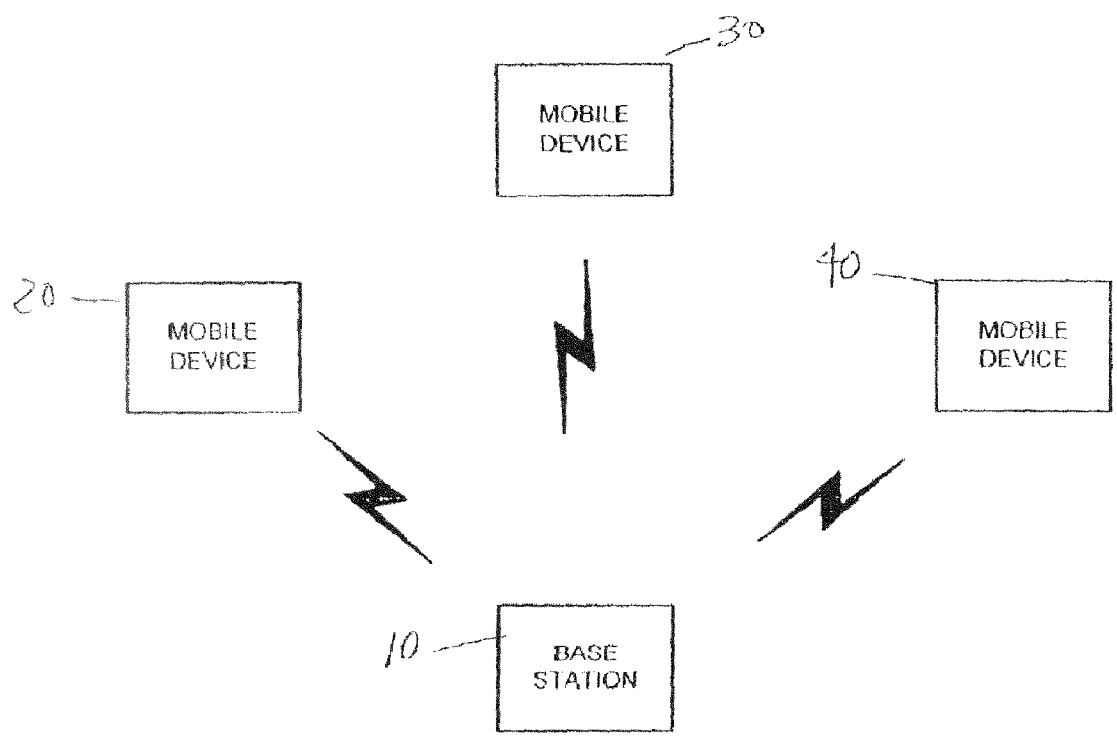
FIG. 6 is a block diagram of a system for transparent block size signaling according to an example embodiment of the present invention.

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment The present invention relates to method and system for transport block size signaling based on modulation type and multicodes for high speed downlink packet access (HSDPA) where the transport block size (TBS) of one modulation scheme is represented by more bits than another modulation scheme, therefore, allowing the first modulation scheme to be used to retransmit packets originally transmitted using the second modulation scheme. The extra one or more bits expands the operation range of the first modulation scheme transport block size signaling.

To illustrate the present invention, modulation schemes of quadrature phase shift keying (QPSK) and 16-quadrature amplitude modulation (QAM) will be used. In this regard, the QPSK TBS may be represented by more bits than the TBS for 16-QAM. Thus, an extra bit may be used for the transport block size signaling when QPSK is used as the modulation scheme for the high speed down link shared channel (HS-DSCH). As stated previously, this extra bit may be used to expand the operation range of the QPSK transport block size signaling. Therefore, seven bits are available for QPSK allowing 128 different transport block sizes for QPSK, and six bits are used for the transport block size for 16-quadrature amplitude modulation (QAM) allowing 64 different transport block sizes for 16 QAM. The 16 QAM block sizes may be a subset of the QPSK block sizes for a given number of channelization codes. The extra signaling bit for the transfer block size using QPSK may be taken from redundancy version signaling. This is advantageous since with QPSK, less redundancy versions are needed (no constellation rearrangements are needed as with 16 QAM). Thus, according to the present invention, the total number of signaling bits is not changed, thus all the channel coding schemes are not changed. Moreover, the present invention allows a base station to use QPSK for a hybrid automatic repeat request (H-ARQ) retransmission even though 16 QAM has been (erroneously) selected for the first transmission. Thus, the robustness of the H-ARQ functionality at the base station is increased.

FIG. 2 shows a diagram of allocation of HS-SCCH signaling bits according to an example embodiment of the present invention. According to the present invention, the channelization code set may be represented by seven bits, the modulation scheme represented by one bit, the H-ARQ process number represented by three bits, the new data indicator represented by one bit, and the CRC (cyclic redundancy check) may be represented by 16 bits. These bit allocations may be the same for both QPSK and 16-QAM. However, for QPSK, the transport block size may be represented by seven bits, whereas for 16-QAM, the transport block size may be represented by six bits. Further, for QPSK, the redundancy version may be represented by two bits, whereas for 16-QAM, the redundancy version and constellation rearrangement parameter may be represented by three bits. Thus, according to the present invention, the transport block size from QPSK is represented by one more bit than the number of bits representing 16 QAM, therefore, allowing packets originally transmitted using 16-QAM to be retransmitted using QPSK as the modulation scheme, if necessary.

FIG. 3 shows a diagram of allocation of HS-SCCH signaling bits according to a second example embodiment of the present invention. This embodiment is similar to that shown in FIG. 2, except here, eight bits may be used to represent the transport block size for QPSK, and seven bits used to represent the transport block size for 16-QAM. Thus, this embodiment of the present invention requires more signaling bits in total.

FIG. 4 shows a diagram of allocation of HS-SCCH signaling bits according to a third example embodiment of the present invention. In this example embodiment, eight bits may be used to represent the transport block size for QPSK and six bits may be used to represent the transport block size for 16-QAM. Further, only one bit may be used to represent the redundancy version for QPSK, and three bits may be used to represent the redundancy version for 16-QAM. Therefore, this embodiment of the present invention only allows two redundancy versions for QPSK.

FIG. 5 shows a diagram of allocation of HS-SCCH signaling bits according to a fourth example embodiment of the present invention. In this example embodiment, eight bits may be used to represent the transport block size for QPSK, and seven bits may be used to represent the transport block size for 16-QAM. Further, one bit may be used to represent the redundancy version for QPSK, and two bits may be used to represent the redundancy version for 16-QAM. Therefore, according to this embodiment of the present invention, the redundancy versions are reduced for both QPSK and 16-QAM, and also reduces the worst-case padding in case the MAC-PDU cannot fit a given transport block size.

FIG. 6 shows a block diagram of a system for transparent block size signaling according to an example embodiment of the present invention. A base station 10 transmits signaling information to one of mobile stations 20, 30 or 40. The signaling information includes a transport block size, redundancy version, modulation mode, and number of multicodes. Once the mobile device receives this information, the mobile device knows that the modulation scheme and transport block size of any packets that are subsequently transferred. This information may be used to appropriately receive the packets. The mobile device uses the correct modulation scheme and knows how to decode the transport block size based on the modulation scheme.

If a base station transfers signaling signifying a modulation mode of 16-QAM, and then transmits packets to a mobile device where one or more of the packets are received in error, the base station may retransmit that particular erroneous packet changing the modulation mode to QPSK. Therefore, according to the present invention, packets originally transmitted using one modulation mode may be retransmitted using a different modulation mode than that used to transmit the original packet. The originally packet may be retransmitted for many reasons, such as being received with errors or problems. A base station may decide to change modulation modes for any number of reasons. For example, a particular modulation mode may be less sensitive to transmission errors for a given set of conditions, channel conditions may have changed since the original transmission, the receiver (mobile device) signal power is lower for a specific modulation scheme or set of conditions, etc.

Figure 7:
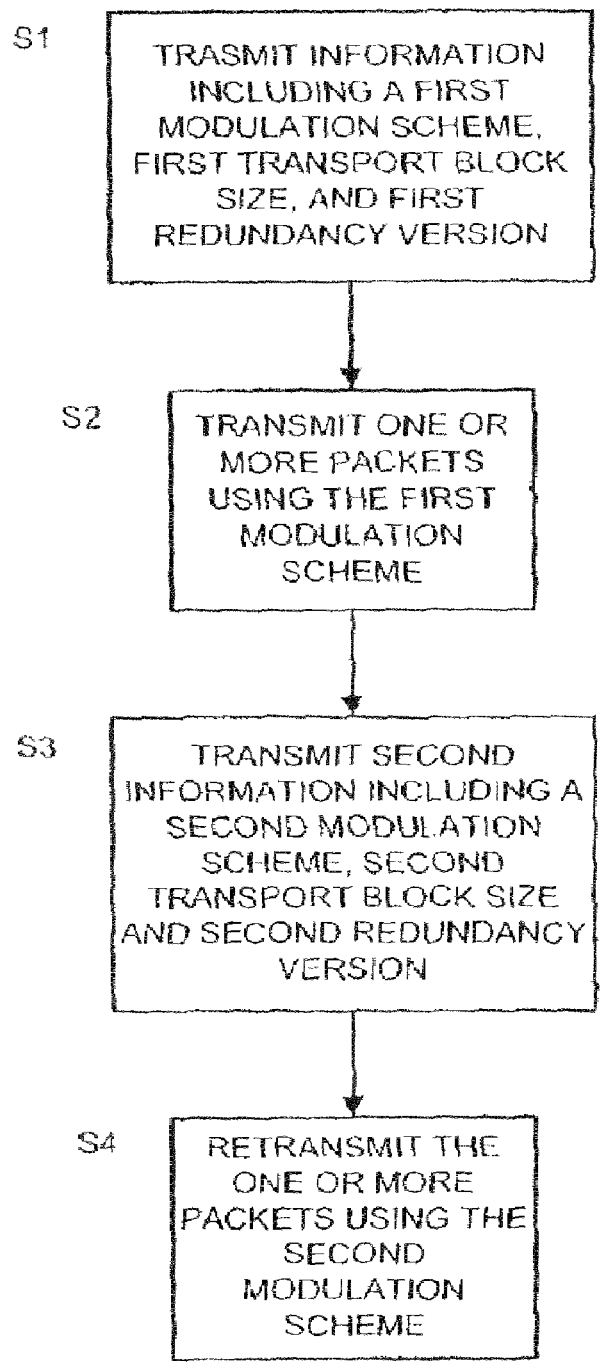
FIG. 7 is a flowchart of a process for transport block size signaling based on modulation type according to an example embodiment of the present invention.

FIG. 7 shows a flowchart of a process for transport block size signaling based on modulation type according to an example embodiment of the present invention. Information may be transmitted including a first modulation scheme, first transport block size, and first redundancy version S1. One or more packets may be then transmitted using the first modulation scheme S2. Second information may be transmitted including a second modulation scheme, second transport block size and second redundancy version S3. The second transport block size may be represented by a number of bits larger than the number of bits representing the first transport block size and the second redundancy version may be represented by a number of bits less than the number of bits representing the first redundancy version. The one or more packets may then be retransmitted using the second modulation scheme S4. The first modulation scheme may be 16 QAM, and the second modulation scheme QPSK. Further, the transmitting of information and the one or more packets in the retransmitting may occur between a base station and a mobile station. This is advantageous specifically in a wideband code division multiple access (WCDMA) system and specifically a WCDMA system implementing high speed downlink packet access (HSDPA).

As noted previously, transport block sizes are a topic of current discussion. These discussions commonly occur among members of working groups that develop industry standards. The members many times belong to various companies and organizations that develop, work in, or work with the technology of the working group. Since it may be desired that the methods and systems according to the present invention be incorporated as an industry standard, following are three sections of text that may be inserted in three current industry documents, respectively, to conform them to implementation according to the present invention.

The three documents that modifications are being shown for include R2-0221668 (Signaling of Transport Block Sizes for HS_DSCH), TS-25.321 (Signalling of Transport Block size for HS-DSCH), and TS-25.212 (Coding for HS-SCCH). The text in each section below is copied from, or similar to, the text that already exist in the specific document, modified to conform the document to implementation according to the present invention. The text also serves to further illustrate methods and systems for transport block size signaling based on modulation type for HSDPA according to the example embodiment of the present invention where the TBS for QPSK is 7 and the TBS for 16QAM is 6.

Modifications to R2-021668

The set of transport block sizes L for channelization code set and modulation scheme combination i in Table 1 below was generated according to:

If i=0 and $k_i$<39

$$L = 137 + 12k_i$$

$k_i = 0, \ldots, 38$ else $$L = \lfloor L_{min} p^{k_{a,i} + k_i} \rfloor$$

p=2085/2048
$L_{min}$=296
$k_{0,i}$=from Table 1
$k_i$=0, . . . , 127 for i=0, . . . , 14
$k_i$=0, . . . , 63 for i=15, . . . , 29
end where $k_i$ is the 6 (for 16QAM) or 7 (for QPSK) bit transport block size index signaled on the HS-SCCH. Note that the if statement above is true only for a single channelization code using QPSK modulation. The value of p above corresponds to a worst case padding of approximately 1.8%.

TABLE 1

| Combination i | Modulation Scheme | Number of channelization codes | $K_{0,i}$ |
|---|---|---|---|
| 0 | QPSK | 1 | 1 |
| 1 | | 2 | 40 |
| 2 | | 3 | 63 |
| 3 | | 4 | 79 |
| 4 | | 5 | 92 |
| 5 | | 6 | 102 |
| 6 | | 7 | 111 |
| 7 | | 8 | 118 |
| 8 | | 9 | 125 |
| 9 | | 10 | 131 |
| 10 | | 11 | 136 |
| 11 | | 12 | 141 |
| 12 | | 13 | 145 |
| 13 | | 14 | 150 |
| 14 | | 15 | 153 |
| 15 | 16QAM | 1 | 40 |
| 16 | | 2 | 79 |
| 17 | | 3 | 102 |
| 18 | | 4 | 118 |
| 19 | | 5 | 131 |
| 20 | | 6 | 141 |
| 21 | | 7 | 150 |
| 22 | | 8 | 157 |
| 23 | | 9 | 164 |
| 24 | | 10 | 169 |
| 25 | | 11 | 175 |
| 26 | | 12 | 180 |
| 27 | | 13 | 184 |
| 28 | | 14 | 188 |
| 29 | | 15 | 192 |

The values of $k_{0,i}$ for different numbers of channelization codes and modulation schemes. The values of $k_{0,i}$ were selected such that the maximum transport block size for a given combination of channelization codes and modulation scheme plus the 24 bit CRC with $k_i$=63 is as close as possible to (but not exceeding) the maximum number of channel bits for the given combination of modulation scheme and channelization code set, i.e., $\lfloor L_{min} P^{k_{0,i}+63} \rfloor 24 \leq$ number of channel bits after rate matching for combination i According to the present invention, with the extra bits for QPSK, it may be possible to exceed this limit, since it is p to the power of $k_{0,i}$+127 instead of 3.

Modifications to TS-25.321

For HS-DSCH the transport block size is derived from the TFRI value signaled oil the HS-SCCH. The mapping between the TFRI value and the transport block size is specified below: For each combination of channelization cod set and modulation scheme i=0.31, a set of $k_i$ transport block sizes L(i, $k_i$) is given by:

If i=0 and $k_i$<39

$$L(i,k_i) = 137 + 12k_i$$

$k_i = 0, \ldots, 38$ else $$L(i,k_i) = \lfloor L_{min} p^{k_{0,i}+k_i} \rfloor$$

p=2085/2048
$L_{min}$=296
$k_{0,i}$=from Table 2
$k_i=0, \ldots, 217$ for $i=0, \ldots, 14$
$k_i=0, \ldots, 63$ for $i=15, \ldots, 29$
end Note that the if statement above is true only for a single channelization code using QPSK modulation. The index $k_i$ of the transport block size $L(i, k_i)$ corresponds to the 6 bit (for 16QAM) or 7 bit (for QPSK) transport block size index signaled on the HS-SCCH. The index i corresponds to the combination of channelization code set and modulation scheme as defined in Table 2.

TABLE 2

| Combination i | Modulation scheme | Number of channelization codes | $K_{0,i}$ |
|---|---|---|---|
| 0 | QPSK | 1 | 1 |
| 1 | | 2 | 40 |
| 2 | | 3 | 63 |
| 3 | | 4 | 79 |
| 4 | | 5 | 92 |
| 5 | | 6 | 102 |
| 6 | | 7 | 111 |
| 7 | | 8 | 118 |
| 8 | | 9 | 125 |
| 9 | | 10 | 131 |
| 10 | | 11 | 136 |
| 11 | | 12 | 141 |
| 12 | | 13 | 145 |
| 13 | | 14 | 150 |
| 14 | | 15 | 153 |
| 15 | 16QAM | 1 | 40 |
| 16 | | 2 | 79 |
| 17 | | 3 | 102 |
| 18 | | 4 | 118 |
| 19 | | 5 | 131 |
| 20 | | 6 | 141 |
| 21 | | 7 | 150 |
| 22 | | 8 | 157 |
| 23 | | 9 | 164 |
| 24 | | 10 | 169 |
| 25 | | 11 | 175 |
| 26 | | 12 | 180 |
| 27 | | 13 | 184 |
| 28 | | 14 | 188 |
| 29 | | 15 | 192 |

Modifications to TS 25.212

4.5.4.3 HARQ Second Rate Matching Stage

HARQ second stage rate matching for the HS-DSCH transport channel shall be done with the general method described in 4.2.7.5 above with the following specific parameters. Bits selected for puncturing which appear as 5 in the algorithm in 4.2.7.5 above shall be discarded and are not counted in the stream towards the bit collection.

The Parameters of the second rate matching stage depend on the value of the RV parameters s and r. The parameter s can take the value 0 or 1 to distinguish between transmissions that prioritize systematic bits (s=1) and non systematic bits (s=0). The parameters r (range 0 to $r_{max}$=1) changes the initial error variable en in the case of puncturing. In case of repetition both parameters r and s change the initial error variable $e_{ini}$. The parameters $X_i$ $e_{plus}$ and $e_{minus}$ are calculated as per Table 3 below.

Denote the number of bits before second rate matching as $N_{sys}$ for the systematic bits, $N_{p1}$ for the parity 1 bits, and $N_{p2}$ for the parity 2 bits, respectively. Denote the number of physical channels used for the HS-DSCH by P. $N_{data}$ is the number of bits available to the HS-DSCH in one TTI and defined as $N_{data} = P \times 3 \times N_{data1}$, where $N_{data1}$ is defined in [2]. The rate matching parameters are determined as follows.

For $N_{data} > N_{sys} + N_{p1} + N_{p2}$, puncturing is performed in the second rate matching stage. The number of transmitted systematic bits in a transmission is $N_{t,sys} = \min\{N_{sys}, N_{data}\}$ for a transmission that prioritizes systematic bits and $N_{t,sys} = \max\{N_{data} - (N_{p1} + N_{p2}), 0\}$ for a transmission that prioritizes non systematic bits. For $N_{data} > N_{sys} + N_{p1} + N_{p2}$ repetition is performed in the second rate matching stage. A similar repetition rate in all bit streams is achieved by setting the number of transmitted systematic bits to $$N_{t,sys} = \left\lfloor N_{sys} \frac{N_{data}}{N_{sys} + 2N_{p1}} \right\rfloor$$

The number of parity bits in a transmission is:

$$N_{t,p1} = \left\lfloor \frac{N_{data} - N_{t,sys}}{2} \right\rfloor \text{ and }$$

$$N_{t,p2} = \left\lceil \frac{N_{data} - N_{t,sys}}{2} \right\rceil$$

for the parity 1 and parity 2 bits, respectively, Table 3 below summarizes the resulting parameter choice for the second rate matching stage.

TABLE 3

| | x | $e_{plus}$ | $e_{minus}$ |
|---|---|---|---|
| Systematic RM S | $N_{sys}$ | $N_{sys}$ | $|N_{sys} - N_{t,sys}|$ |
| Parity 1 RM P1_2 | $N_{p1}$ | $2 N_{p1}$ | $2|N_{p1} - N_{t,p1}|$ |
| Parity 2 RM P2_2 | $N_{p2}$ | $N_{p2}$ | $|N_{p2} - N_{t,p2}|$ |

Table 3 shows parameters for HARQ second rate matching. The rate matching parameter $e_{ini}$ is calculated for each bit stream according to the RV parameters r and s using $$e_{ini}(r) = \{(X_i - \lfloor re_{plus}/r_{max} \rfloor - 1) \bmod e_{plus}\} + 1 \text{ in the case of puncturing,}$$

i.e., $N_{data} \leq N_{sys} + N_{p1} + N_{p2}$, and $$e_{ini}(r) = \{(_i - \lfloor (s+22)e_{plus}/(2r_{max}) \rfloor - 1) \bmod e_{plus}\} + 1 \text{ for repetition, i.e.,}$$

$N_{data} > N_{sys} + N_{p1} + N_{p2}$. Where $r \in \{0, 1, \ldots, r_{max}-1\}$ and $r_{max}=2$ is the total number of redundancy versions allowed by varying r as defined in 4.6.2.

Note: For the modulo operation the following clarification is used: the value x mod y) is strictly in the range of 0 to y−1 (i.e. −1 mod 10=9).

4.6 Coding for HS-SCCH

The following information is transmitted by means of the HS-SCCH physical channel.

Channelization-code-set information (7 bits):

$x_{CCS,1}, x_{CCS,3}, \ldots, x_{CCS,7}$

Modulation scheme information (1 bit):

$x_{ms,1}$

Transport-block size information (6 bits for 16 QAM, 7 bits for QPSK):

$x_{tbs,1}, x_{tbs,2}, \ldots, x_{tbs,6}[, x_{tbs,7}]$

Hybrid-ARQ process information (3 bits): $x_{hap,1}, x_{hap,2}, x_{hap,3}$

Redundancy and constellation version (3 bits for 16 QAM, 2 bits for QPSK):

$x_{rv,1}, x_{rv,2}, [x_{rv,3}]$

New data indicator (1 bit):

$x_{nd,1}$

UE identity (16 bits):

$x_{ue,1}, x_{uc,2}, \ldots, x_{ue,16}$

4.6.1 Overview

Figure 8:
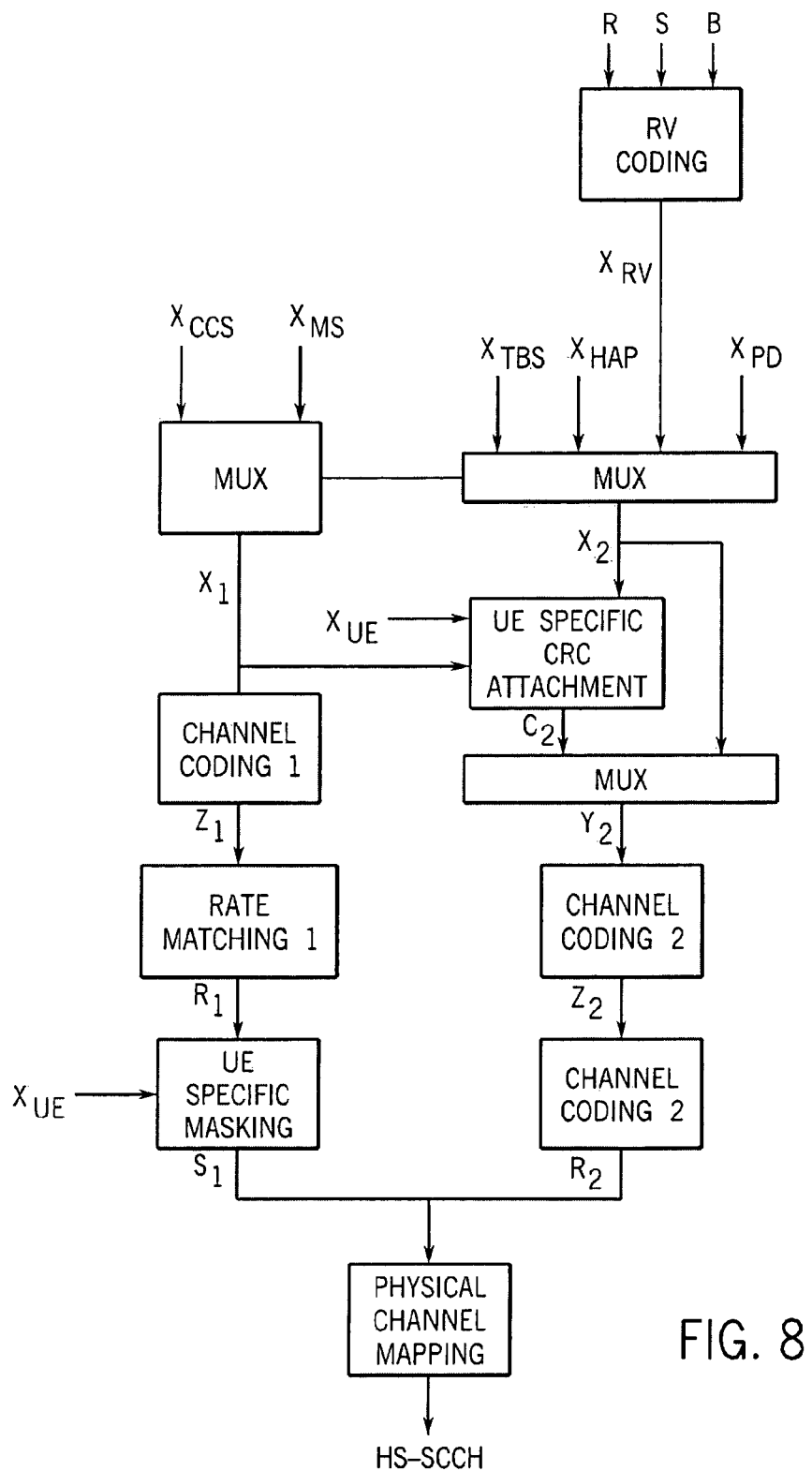
FIG. 8 is a diagram illustrating the overall coding chain for HS-SCCH.

FIG. 8 shows a diagram illustrating the overall coding chain for HS-SCCH.

4.6.2.1 Redundancy and Constellation Version Coding

The redundancy version (RV) parameters r, s and constellation version parameter b are coded jointly to produce the value $X_{rv,1}, X_{rv,2}$ is alternatively represented as the sequence $x_{rv,1}, x_{rv,2}, x_{rv}$ (for 16QAM) or as $x_{rv,1}, x_{rv,2}$ (for QPSK) where $x_{rv,1}$ is the msb. This is done according to the following tables according to the modulation mode used. Table 4 shows RV coding for 16 QAM, and Table 5 shows RV coding for QPSK.

TABLE 4

| $X_{rv}$ (value) | s | r | B |
|---|---|---|---|
| 0 | 1 | 0 | 0 |
| 1 | 0 | 0 | 0 |
| 2 | 1 | 1 | 1 |
| 3 | 0 | 1 | 1 |
| 4 | 1 | 0 | 1 |
| 5 | 1 | 0 | 2 |
| 6 | 1 | 0 | 3 |
| 7 | 1 | 1 | 0 |

TABLE 5

| $X_{rv}$ (value) | s | r |
|---|---|---|
| 0 | 1 | 0 |
| 1 | 0 | 0 |
| 2 | 1 | 1 |
| 3 | 0 | 1 |

4.6.2.2 Modulation Scheme Mapping

The value if $x_{ms,1}$ is derived from the modulation and given by the following:

$$x_{ms,1} = \begin{cases} 0 \text{ if } QPSK \\ 1 \text{ if } 16QAM \end{cases}$$

4.6.2.3 Channelization Code-set Mapping

The channelization code-set bite $x_{CCS,1}, x_{CCS,2}, \ldots, x_{CCS,7}$ are coded according to the following:

Given P (multi-)codes starting at code O calculate the information-field using the unsigned binary representation of integers calculated by the expressions, for the first three bits (code group indicator):

$x_{CCS,1}, x_{CCS,2}, x_{CCS,3} = \min(P-1, 15-P)$ for the last four bits (code offset indicator):

$x_{CCS,4}, x_{CCS,5}, x_{CCS,6}, x_{CCS,7} = |O - 1 - \lfloor P/8 \rfloor * 15|$.

The definitions of P and 0 are given in [3].

5.6.3 Multiplexing of HS-SCCH Information

The channelization-code-set info nation $x_{CCS1}, x_{CCS,1}, x_{CCS,2}, \ldots, x_{CCS,7}$ and modulation-scheme information $x_{m,1}$, are multiplexed together. This gives a sequence of bits $x_{1,1}, x_{1,2}, x_{1,8}$ where $x_{1,i} = x_{CCS,i}$ i=1, 2, ..., 7

$x_{1,i} = x_{ms,i-7}$ i=8

The transport-block-size information $x_{tbs,1}, x_{tbs,2}, \ldots, x_{tbs,6}$ (for 16QAM) or $x_{tbs,1}, x_{tbs,2}, \ldots, x_{tbs,7}$ (for QPSK), Hybrid-ARQ-process information $x_{hap,1}, x_{hap,2}, x_{hap,3}$, redundancy-version information $x_{rv,1}, x_{rv,2}, x_{rv,3}$ (for 16QAM) or $x_{rv,1}, x_{rv,2}$ (for QPSK) and new-data indicator $x_{nd,1}$ are multiplexed together. This gives a sequence of bits $x_{2,1}, x_{2,2}, \ldots, x_{2,13}$ where For 16QAM:

$x_{2,i} = x_{tbs,i}$ i=1, 2, ..., 6

$x_{2,i} = x_{hap,i-6}$ i=7, 8, 9

$x_{2,i} = x_{rv,i-0}$ i=10, 11, 12

$x_{x,i} = x_{j-12}$ i=13 and for QPSK:

$s_{2,i} = x_{tbs,i}$ i=1, 2, ..., 7

$x_{2,i} = x_{hap,i-6}$ i=8, 9, 10

$x_{2,i} = x_{rv,i-9}$ i=11, 12

$x_{2,i} = x_{i-12}$ i=13

4.6.4 CRC Attachment for HS-SCCH

From the sequence of bits $x_{1,1}, x_{1,2}, \ldots x_{1,8}, x_{2,1}, x_{2,2}, x_{2,13}$ a 16 bits CRC is calculated according to Section 4.2.1.1. This gives a sequence of bits $x_1, x_2, \ldots, x_{16}$ This sequence of bits is then masked with the UE ID $x_{ue,1}, x_{ue,2}, \ldots, x_{ue,16}$, where $x_{ue,1}$ is the MSB and $x_{ue,16}$ is the LSB of the UE ID, and then appended to the sequence of bits $x_{2,1}, x_{2,2}, \ldots, x_{2,13}$ The UE ID corresponds to the HS-DSCH Radio Network Identifier (H-RNTI) as defined in [13], expressed in unsigned binary form. The mask CRC bits correspond to the sequence of bits $y_1, y_2, \ldots, y_{29}$, where $y_i = x_{2,i}$ i=1, 2, ..., 13

$y_i = c_{i-13} + x_{ue,i-13}$ mod 2 i=14, 15, ..., 29

4.6.5 Channel Coding for HS-SCCH

Rate {fraction (⅓)} convolutional coding, as described in Section 4.2.3.1, is applied to the sequence of bits $x_{1,1}, x_{1,2}, \ldots, x_{1,8}$ This gives a sequence of bits $z_{1,1}, z_{1,2}, \ldots, Z_{1,48}$.

Rate {fraction (⅓)} convolutional coding, as described in Section 4.2.3.1, is applied to the sequence of bits $y_1, y_2, \ldots, y_{29}$. This gives a sequence of bits $z_{2,1}, z_{2,2}, \ldots, z_{1,48}$.

Note that the coded sequence lengths result from the termination of K=9 convolutional coding being fully applied.

4.6.6 Rate Matching for HS-SCCH

From the input sequence $z_{1,1}, z_{1,2}, z_{1,48}$ the bits $a_{1,1}, z_{1,2}, z_{1,4}, z_{1,8}, z_{1,42}, z_{1,45}, z_{1,47}, z_{1,48}$ are punctured to obtain the output sequence $r_{1,1}, r_{1,2} \ldots r_{1,40}$.

From the input sequence $z_{2,1}, z_{2,2}, \ldots, z_{2,111}$ the bits $z_{2,1}, z_{2,2}, z_{2,3}, z_{2,4}, z_{2,5}, z_{2,6}, z_{2,7}, z_{2,8}, z_{2,12}, z_{2,14}, z_{2,15}, z_{2,24}, z_{2,42}, z_{2,48}, z_{2,54}, z_{2,57}, z_{2,60}, z_{2,66}, z_{2,69}, z_{2,96}, z_{2,99}, z_{2,101}, z_{2,102}, z_{2,104}, z_{2,105}, z_{2,106}, z_{2,107}, z_{2,108}, z_{2,109}, z_{2,110}, z_{2,111}$ are punctured to obtain the output sequence $r_{2,1}, r_{2,2}, r_{2,80}$.

4.6.7 UE Specific Masking for HS-SCCH

The rate matched bits $r_{1,1}, r_{1,2} \ldots r_{1,40}$ shall be masked in an UE specific way using the UE ID $x_{ue,1}, x_{uc,2}, \ldots, x_{ue,16}$, where $x_{ue,1}$ is the MSB and $x_{ue,16}$ is the LSB of the UE ID, to produce the bits $s_{1,1}, x_{1,2} \ldots s_{1,40}$. The UE ID corresponds to the HS-DSCH Radio Network Identifier (H-RNTI) as defined in [13], expressed in unsigned binary form.

Intermediate code word bits bi, $i=1, 2 \ldots 48$, are defined by endcoding the UE ID bits using the rate {fraction (½)} convolutional coding described in Section 4.2.3.1. Eight bits out of the resulting 48 convolutionally encoded bits are punctured using rate matching with the general method described in Section 4.2.7.5 where $X_i=48$, $e_{ini}=1$, $e_{plus}=96$ and $e_{minus}=16$. That is, from the input sequence $b_1, b_2, \ldots, b_{48}$, the bits $b_1, b_7, b_{13}, b_{19}, b_{25}, b_{31}, b_{37}, b_{43}$ are punctured to obtain the 40 bit UE specific scrambling sequence $c_1, c_2 \ldots c_{40}$. The mask output bits $s_{1,1}, s_{1,2} \ldots S_{1,40}$ are calculated as follows:

$$s_{1,k}=(r_{1,k}+c_k) \bmod 2$$

for $k=1, 2, \ldots 40$

4,6.8 Physical Channel Mapping for HS-SCCH

The sequence of bits $s_{1,1}, s_{1,2}, \ldots, s_{1,40}$ is mapped to the first slot of the HS-SCCH sub frame. The bits $s_{1,k}$ are mapped to the PhCHs so that the bits for each PhCH are transmitted over the air in ascending order with respect to k.

The sequence of bits $r_{2,1}, r_{2,2}, \ldots, r_{2,80}$ is mapped to the second and third slot of the HS-SCCH sub frame. The bits $r_{2,k}$ are mapped to the PhCHs so that the bits for each PhCH are transmitted over the air in ascending order with respect to k.

The previous portions of text are for illustrative purposes and do not limit the scope of the present invention. Although the text portions for documents R2-0221668, TS-25.321, and TS-25.212 have been shown illustrating only one embodiment of the present invention (TBS=7 for QPSK and TBS=6 for 16 QAM) other embodiments of the present invention may also be included into these documents. Moreover, implementation of the present invention is not restricted to or limited by the values for the parameters in the various tables and figures discussed. Any embodiments where the transfer block size for one modulation scheme (e.g., QPSK) is represented by more bits that a second modulation scheme (e.g.,) 16 QAM) are still within the limitations of the present invention.

Methods and system according to the present invention are advantageous in that retransmission of a packet may occur using a different modulation scheme (e.g., QPSK) when the original packet may have been transferred with a different modulation scheme (e.g., 16 QAM) This increases the robustness of HARQ functionality at a base station in a system.

It is noted that the foregoing examples have been provided merely for the purpose of explanation and are in no way to be construed as limiting of the present invention, While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A device for communicating with a mobile device, the device comprising:
   a transmitter configured
      to transmit a first modulation scheme, a first transport block size, and a first redundancy version to a mobile device, wherein the first transport block size is represented by a first number of bits and the first redundancy version is represented by a second number of bits;
      to transmit a packet based on the first modulation scheme to a mobile device;
      to transmit a second modulation scheme, a second transport block size, and a second redundancy version to the mobile device, wherein the second transport block size is represented by a third number of bits and the second redundancy version is represented by a fourth number of bits, and further wherein the third number of bits is greater than the first number of bits, and the fourth number of bits is less than the second number of bits; and
      to transmit the packet based on the second modulation scheme to the mobile device.

2. The device of claim 1, wherein the first modulation scheme comprises 16-quadrature amplitude modulation.

3. The device of claim 1, wherein the second modulation scheme comprises quadrature phase shift keying.

4. The device of claim 1, wherein the first transport block size and the second transport block size have the same value.

5. The device of claim 1, wherein the device supports high speed downlink packet access.

6. The device of claim 1, wherein the third number of bits is seven bits and the first number of bits is six bits.

7. The device of claim 1, wherein the third number of bits is eight bits.

8. The device of claim 7, wherein the first number of bits is seven bits or six bits.

9. The device of claim 1, wherein the second number of bits is three bits or two bits.

10. The device of claim 1, wherein the fourth number of bits is one bit or two bits.

11. A device for communicating with another device, the device comprising:
    a receiver configured
       to receive a first modulation scheme, a first transport block size, and a first redundancy version to a mobile device, wherein the first transport block size is represented by a first number of bits and the first redundancy version is represented by a second number of bits;
       to receive a packet based on the first modulation scheme from a first device;
       to receive a second modulation scheme, a second transport block size, and a second redundancy version to the mobile device, wherein the second transport block size is represented by a third number of bits and the second redundancy version is represented by a fourth number of bits, and further wherein the third number of bits is greater than the first number of bits, and the fourth number of bits is less than the second number of bits; and
       to receive the packet based on the second modulation scheme from the first device.

12. The device of claim 11, wherein the first modulation scheme comprises 16-quadrature amplitude modulation.

13. The device of claim 11, wherein the second modulation scheme comprises quadrature phase shift keying.

14. The device of claim 11, wherein the first transport block size and the second transport block size have the same value.

15. The device of claim 11, wherein the device supports high speed downlink packet access.

16. The device of claim 11, wherein the third number of bits is seven bits and the first number of bits is six bits.

17. The device of claim 11, wherein the third number of bits is eight bits.

18. The device of claim 17, wherein the first number of bits is seven bits or six bits.

19. The device of claim 11, wherein the second number of bits is three bits or two bits.

20. The device of claim 11, wherein the fourth number of bits is one bit or two bits.

* * * * *